US005742788A

United States Patent [19]

Priem et al.

[11] Patent Number: 5,742,788

[45] Date of Patent: Apr. 21, 1998

[54] METHOD AND APPARATUS FOR PROVIDING A CONFIGURABLE DISPLAY MEMORY FOR SINGLE BUFFERED AND DOUBLE BUFFERED APPLICATION PROGRAMS TO BE RUN SINGLY OR SIMULTANEOUSLY

[75] Inventors: Curtis Priem, Fremont; Chris Malachowsky, Santa Clara; Bruce McIntyre, Cupertino; Guy Moffat, Palo Alto, all of Calif.

[73] Assignee: Sun Microsystems, Inc., Mountain View, Calif.

[21] Appl. No.: 266,095

[22] Filed: Jun. 27, 1994

Related U.S. Application Data

[63] Continuation of Ser. No. 736,104, Jul. 26, 1991, abandoned.

[51] Int. Cl.$^{6}$ .......... G06F 12/06

[52] U.S. Cl. .......... 395/437; 395/431; 395/481; 395/484; 395/492; 395/497.01

[58] Field of Search .......... 395/428, 484, 395/495

[56] References Cited

U.S. PATENT DOCUMENTS

| | | | |
|---|---|---|---|
| 4,694,392 | 9/1987 | Ballard et al. | 364/200 |
| 4,737,921 | 4/1988 | Goldwasser et al. | 364/518 |
| 4,742,342 | 5/1988 | Chatham et al. | 340/723 |
| 4,800,431 | 1/1989 | Deering | 358/160 |
| 4,862,154 | 8/1989 | Gonzalez-Lopez | 340/747 |
| 4,878,117 | 10/1989 | Ikehira et al. | 358/183 |
| 4,947,342 | 8/1990 | Katsura et al. | 395/136 |
| 4,954,819 | 9/1990 | Watkins | 340/721 |
| 4,980,765 | 12/1990 | Kudo et al. | 358/160 |
| 5,056,044 | 10/1991 | Frederickson et al. | 395/164 |
| 5,062,057 | 10/1991 | Blacken et al. | 395/166 |
| 5,065,368 | 11/1991 | Gupta et al. | 365/230.05 |
| 5,083,119 | 1/1992 | Trevett et al. | 340/723 |
| 5,113,487 | 5/1992 | Ogura et al. | 395/100 |
| 5,185,599 | 2/1993 | Doornink et al. | 395/143 |
| 5,287,100 | 2/1994 | Guttag et al. | 345/213 |
| 5,309,551 | 5/1994 | Guttag et al. | 395/131 |
| 5,341,470 | 8/1994 | Simpson et al. | 395/164 |

*Primary Examiner*—Reba I. Elmore
*Attorney, Agent, or Firm*—Blakely Sokoloff Taylor & Zafman LLP

[57] ABSTRACT

An arrangement providing frame buffer memory for an output display by which single buffer and double buffered application programs may be run singly or simultaneously is described. An array of video random access memory sufficient to store data for at least two complete frames is configured in three different ways depending on the applications being run. When only programs designed to run on a single frame buffer are run, the memory is configured as a single frame buffer. When a single program designed to run on double frame buffers is run, the memory is configured as two visible frame buffers. When multiple programs designed to run on double frame buffers are run, the memory is configured into one visible and one invisible frame buffer. Additionally, apparatus for selecting data to be furnished to the display depending on whether the program operates as a single buffered program, a double buffered program, or a plurality of double buffered programs is provided.

12 Claims, 3 Drawing Sheets

METHOD AND APPARATUS FOR PROVIDING A CONFIGURABLE DISPLAY MEMORY FOR SINGLE BUFFERED AND DOUBLE BUFFERED APPLICATION PROGRAMS TO BE RUN SINGLY OR SIMULTANEOUSLY

This is a continuation of application Ser. No. 07/736,104 filed Jul. 26, 1991, abandoned.

CROSS REFERENCE TO RELATED APPLICATIONS

This application is related to U.S. patent applications: Ser. Nos. 08/068,591 entitled *Apparatus for Fast Copying Between Frame Buffers in a Double Buffered Output Display System*, Priem, et al., filed on Jul. 26, 1991; Ser. No. 07/716,671, entitled *Method for Allocating Off Screen Display Memory* B. McIntyre, et al. filed Jun. 17, 1991; and Ser. No. 07/716,001, entitled *Apparatus for Selecting Frame Buffers for Display in a Double Buffered Display System* Priem, et al., filed Jun. 17, 1991.

BACKGROUND OF THE INVENTION

1. Field of the Invention

This invention relates to computer display memory and, more particularly, to methods and apparatus for providing display memory which may be configured to suit the software being run by the computer.

2. History of the Prior Art

A typical computer system generates data which is displayed on an output display. This output display is typically a cathode ray tube which produces a number of full screen images one after another so rapidly that to the eye of the viewer the screen appears to display constant motion when a program being displayed produces such motion. In order to produce the individual images (frames) which are displayed one after another, data is written into a frame buffer. The frame buffer stores information about each position on the display which can be illuminated (each pixel) to produce the full screen image. For example, a display may be capable of displaying pixels in approximately one thousand horizontal rows each having approximately one thousand pixels. All of this information in each frame is written to the frame buffer before it is scanned to the display.

When data describing an entire picture exists in the frame buffer, the frame may be transferred to the display. Typically, data is transferred from the frame buffer to the display pixel by pixel and line by line beginning at the upper left hand corner of the display and proceeding horizontally from left to right, line by line, downward to the lower right hand corner of the display. In order for the picture to appear continuous on the output display, the successive frames in the frame buffer must be constantly scanned to the output display at a rate of thirty frames per second or more.

While each frame of data is being scanned to the display, new data to appear in the next frame must be transferred to the frame buffer. In general, only data which is changing replaces old data in the frame buffer. The central processing unit running the application program typically selects those positions at which changes are to take place in any particular frame. These changes occurs at frame buffer positions representing those pixel positions which are changing on the screen. All unchanged data remains in the frame buffer without change. New data to be displayed in a frame may be written to the portion of the frame buffer being changed at any time. In order to allow information to be both written to the frame buffer and scanned from the frame buffer to the output display simultaneously, two ported video random access memory (VRAM) is used for the frame buffer. Data is written through one port and scanned to the display through the other. VRAM is more expensive than typical dynamic random access memory (DRAM) because providing the two ports requires significantly more transistors.

If data is being placed in a VRAM frame buffer at the same time that information is being scanned to the display, it is possible that information being scanned to the display will come from two time displaced frames. For example, if scanning is proceeding at a faster rate than data is being written to the frame buffer and a portion of the frame buffer which is changing (being written) is scanned to the display, a portion of the display will be from what should be a first frame and a portion from what should be a succeeding frame. The display of portions of two time displaced frames simultaneously is called frame tearing. This can be disconcerting where the display is rapidly changing as in real time video, for images may be grossly distorted.

In order to eliminate frame tearing, double buffered display memory is used. Double buffering uses two complete frame buffers each of which may store one entire frame. The system includes circuitry which responds to program control so that data is written to one frame buffer and scanned to the display from the other. In its simplest form, this is accomplished using a pair of VRAM frame buffers and multiplexing the data in one or the other of the frame buffers to the display. In this form, data is never written to a frame buffer during the time the data it contains is being scanned to the display. Once a frame has been completely written, it may in turn be scanned to the display and data written to the other frame buffer. Since data is never written to a frame buffer while its contents are being scanned to the display, frame tearing cannot occur. Double buffering is typically used with programs which present rapidly changing data on the output display.

One of the primary aims of computer designers is to allow a number of individual programs to run on a computer and be displayed simultaneously on an output display of that computer. Typically, when a number of individual programs are displayed on a computer output display, each individual program appears in a window, typically a rectangular area of the screen which may be moved about, enlarged and reduced in size, and otherwise manipulated. If a number of programs can be run and displayed in a number of windows simultaneously, the work being accomplished using the computer may be accelerated.

Typically, information being written to the individual windows by the different individual programs will be written at different rates. For example, the information being directed to a window displaying real time video changes very rapidly while the information typed from the keyboard to a word processing program being displayed in another window changes much more slowly. Consequently, the rate at which frames are changed varies from program to program.

The simplest form of double buffering described above to eliminate frame tearing is very useful when a single program is being run in doubled buffered mode on the output display. However, where a number of programs are being run simultaneously in different windows on the same output display and a number of these programs are subject to frame tearing, this form of double buffering is insufficient. The reason for this is that the simple form of double buffering succeeds by scanning the entire contents of each frame buffer to the display when the double buffered window has been completed. If data is being written to the frame buffers for a number of windows at asynchronous rates, then the timing at which writing occurs differs from window to window. It is very difficult and often impossible to adjust the timing of the writing so that no writing occurs while a frame buffer is being scanned to the display. Consequently, frame tearing can occur when a number of windows displaying rapidly changing data are running simultaneously on the display.

To solve this problem, an advanced form of double buffering has been used which adds another buffer called a window identification (ID) plane. The window identification plane provides a storage position for each pixel which is to be displayed on the output display. Stored in these positions of the window ID plane are identifications of the window to which each pixel of data to be displayed is related. Use of this plane allows a pixel from either frame buffer to be selected for display in any frame. Thus, the window ID plane may be used to assure that the scan to the display involves data only from windows to which data is not being written at the time of the scan. This form of double buffering allows frame tearing to be eliminated where multiple double buffered active windows appear simultaneously on the output display.

This second form of double buffering is quite expensive because it adds an ID plane containing memory for each pixel of the display and circuitry for selecting pixels to be displayed based on the windows in which they appear. Consequently, experimenters have looked for arrangements which would reduce the expense of the double buffering useful with multiple window operations. One form of double buffering which has been used in the prior art to reduce cost replaces one of the VRAM frame buffers with a single-ported DRAM frame buffer and eliminates the control circuitry which allows scanning to the display from either of the frame buffers. Instead, all frames are scanned to the display from the single remaining VRAM frame buffer; and all new data is written to the DRAM frame buffer. Once written, the data in the DRAM frame buffer is copied by the central processing unit from the DRAM frame buffer to the VRAM frame buffer from which it is scanned to the display.

This form of double buffering is much less expensive than the other forms because less expensive DRAM replaces one of the VRAM frame buffers and the control circuitry for multiplexing is eliminated. This arrangement is also useful because it works well with software conforming to the XII standard (X Windows) which does not expect to see more than a single frame buffer and stores information to be transferred to the frame buffer in a section of main memory. To this software, the DRAM frame buffer appears to be such a portion of main memory. Because the DRAM frame buffer does not transfer data directly to the output display, it is referred to herein as the invisible frame buffer while the VRAM frame buffer is referred to as the visible frame buffer. The arrangement also offers the advantage that individual windows may be transferred from the invisible DRAM frame buffer to the VRAM frame buffer since the central processing unit may selectively control the areas to be transferred.

However, the copying of information from the DRAM frame buffer to the VRAM frame buffer has been relatively slow compared to the typical scan rate to the display. Consequently, it is possible for writing to the VRAM frame buffer to occur in a portion from which information is being scanned to the display; and the problem of frame tearing arises. To obviate this problem, a new arrangement has been proposed which allows information to be copied to the VRAM frame buffer at a drastically faster rate, a rate faster than the scan out to the display. This allows inexpensive circuitry to accomplish double buffering of multiple windows while eliminating the problem of frame tearing. This new arrangement is described in U.S. patent application Ser. No. 809/068,891, entitled *Apparatus for Fast Copying Between Frame Buffers In a Double Buffered Output Display System*, Priem et al, filed on even date herewith and assigned to the assignee of the present invention.

Having provided an inexpensive arrangement to accomplish the double buffering for an output display in a multiple window environment, a problem arises as to how to deal with software which both expects double buffering to occur and software which does not. As described above, certain software runs well on display circuitry which uses only a single frame buffer while other software requires double buffering. It is necessary from an economic basis that if a new display system replaces an older arrangement to allow more advanced software to be run, that the new system be capable of running both types of software. Often, this has not been the case.

SUMMARY OF THE INVENTION

It is, therefore, an object of the present invention to provide an output display architecture which may be configured to operate with software provided before its existence and software developed after its existence.

It is another more specific object of the present invention to provide an output display architecture which may be configured to operate with software which may be used in double buffered display arrangement and with software which may not be so used.

These and other objects of the present invention are realized in an arrangement providing frame buffer memory for an output display by which single buffered and double buffered application programs may be run singly or simultaneously comprising an array of video random access memory sufficient to store data for at least two complete frames to be displayed on an output display; apparatus for configuring the array of memory to form a single frame buffer when used with programs designed to run on a single frame buffer, to form two visible frame buffers when used with a single program designed to run on double frame buffers, and to form one visible and one invisible frame buffer when used with a plurality of programs designed to run on double frame buffers; and apparatus for selecting data to be furnished to the display depending on whether the program operates as a single buffered program, a double buffered program, or a plurality of double buffered programs.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
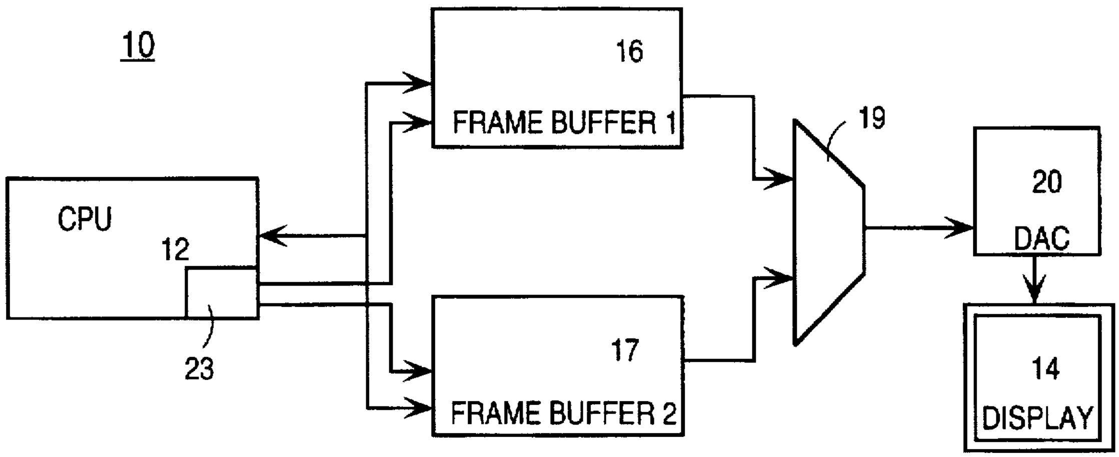
Fig. 1 (Prior Art)
FIG. 1 is a block diagram of a simple double buffered display system of the prior art.

Referring now to FIG. 1, there is illustrated a first arrangement 10 in accordance with the prior art for providing double buffering of pixel data to be presented on an output display. The arrangement 10 illustrated includes only the rudiments of the circuitry required to provide data to an output display terminal used in a typical computer system. Other portions necessary for providing the operations of a computer are well known to those skilled in the art and are not shown in the figure. Illustrated are a central processing unit 12 which may control the operation of the entire computer system and which represents in FIG. 1 circuitry for providing data to be displayed on an output display 14. The unit 12 might, instead of a central processor, be an arrangement for accelerating the transfer of graphics data to an output display or some other source of pixel data. In order to accomplish the transfer of the data from the central processing unit 12 to the output display 14, first and second frame buffers 16 and 17 are utilized.

In the arrangement 10, data is written from the unit 12 to one frame buffer and scanned to the display 14 from the other. This is accomplished using a pair of VRAM frame buffers and multiplexing the entire frame of data in one of the frame buffers 16 or 17 to the display by means of a multiplexor 19. The data transferred by the multiplexor 19 is converted from digital to analog form by a digital-to-analog converter 20 and scanned to the display 14. In this form of double buffering, data is never written to a frame buffer 16 or 17 during the time data is being scanned to the display 14 from that frame buffer. Once new data has been written to a frame buffer 16 or 17 to complete a new frame, the data in that frame buffer may in turn be scanned to the display 14; and new data may be written to the other frame buffer. Since data is never written to a frame buffer while its contents are being scanned to the display, frame tearing cannot occur.

A problem with this form of double buffering arrangement, however, is that it is incapable of providing other than a full frame of data to the output display. Consequently, this arrangement 10 is not useful where it is desired to present multiple double buffered windows on the output display with the assurance that no frame tearing will occur. The different rates at which data may be written to the frame buffer for the different windows eliminates the assurance that no data is written to a frame buffer while its contents are being scanned to the display.

As described above, to solve this problem, an advanced form of double buffering has been which adds another buffer called a window identification (ID) plane. The window identification plane contains a storage position for each pixel displayed on the output display. Each such storage position provides an identification (by window number) of the pixel which is to be written to the display. Use of this plane allow pixels from either buffer to be selected for display at any time. Thus, the window ID plane may be used to scan to the display data from any window to which data is not being written at the time of the scan. This form of double buffering allows frame tearing to be eliminated where multiple double buffered active windows appear simultaneously on the output display.

This second form of double buffering is quite expensive because it adds an ID plane containing memory for each pixel of the display and circuitry for selecting pixels to be displayed based on the windows in which they appear.

In order to reduce the expense of arrangements using a window ID plane, one prior art arrangement has replaced the VRAM used in the frame buffer 16 of FIG. 1 with DRAM. In such a system, all new data is written by the central processing unit to the DRAM frame buffer. Since DRAM is single ported, the DRAM frame buffer does not provide an output which may be scanned directly to the display. Instead, once new data has been stored in the DRAM frame buffer, the new data is copied from the DRAM frame buffer to the VRAM frame buffer by the central processing unit. All data is then scanned to the display from the VRAM frame buffer. Consequently, the lines from the DRAM frame buffer to the multiplexor 19 are eliminated. Since no output is transferred from the DRAM frame buffer to the multiplexor 19, the multiplexor 19 is also eliminated. With no multiplexor, the control circuitry for selecting one or the other of the frame buffers to scan to the display is also unnecessary and is eliminated. This substantially reduces the cost of the system.

One problem with such an arrangement is that the time required to copy data from the DRAM frame buffer to the VRAM frame buffer is excessive. Only approximately twenty frames are copied per second to the VRAM frame buffer, while a typical display may be receiving data from the VRAM frame buffer at a rate of seventy-six frames per second, approximately three times the rate of the copying to the VRAM frame buffer. Consequently, the scan to the display may catch up with the copying of data into the VRAM frame buffer from the DRAM frame buffer and cause frame tearing.

Figure 2:
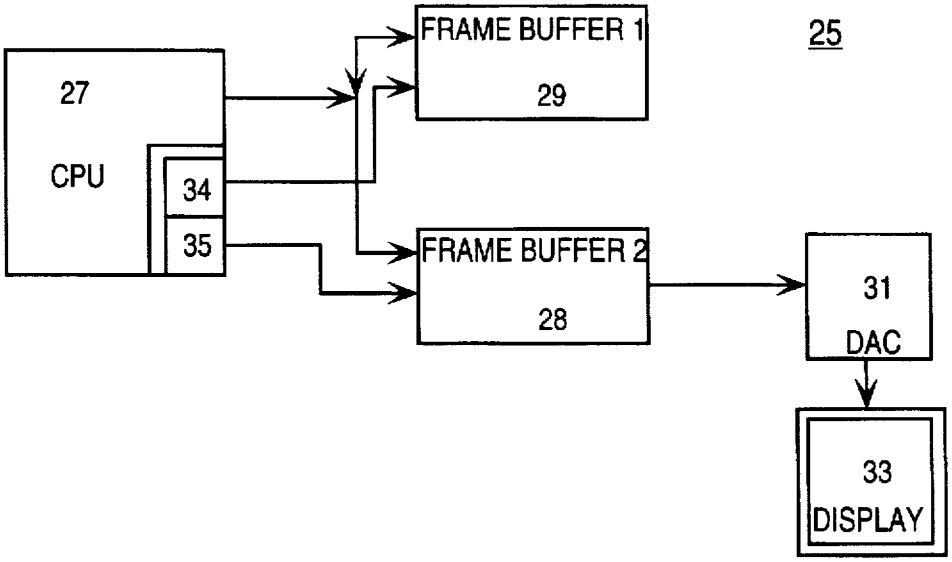
FIG. 2 is a block diagram of an inexpensive double buffered display system capable of functioning in multiple window displays.

The arrangement of the copending patent application, entitled *Apparatus for Fast Copying Between Frame Buffers In a Double Buffered Output Display System*, illustrated in FIG. 2, obviates the problem of frame tearing in this less expensive double buffering system. The arrangement 25 copies the data from a DRAM frame buffer 29 to a VRAM frame buffer 28 over four times faster than does the prior art circuitry. Thus, eighty or more frames per second may be written to the frame buffer 28 from the frame buffer 29; and tearing of frames scanned to the display may be eliminated.

The fast copying of data from the frame buffer 29 to the frame buffer 28 is accomplished by accessing both frame buffers 28 and 29 simultaneously. Data is still written only to the frame buffer 29. However, when data is to be read from the frame buffer 29 and written to the frame buffer 28, the control circuit 35 selects the appropriate row and column addresses in the frame buffer 29, and the control circuit 34 selects the same row and column addresses in the frame buffer 28. Then the control circuit 34 reads the accessed data in the frame buffer 29 and places it on the bus where the information in written to the same accessed addresses in the frame buffer 28.

Because the time necessary to copy from the frame buffer 29 to the frame buffer 28 is reduced to less than one quarter, more than four times as many full frames of data can be written to the frame buffer 28 using the invention as in prior art double buffering arrangements. Thus, over eighty frames per second may be written to the frame buffer 28 while the highest scan rate from the frame buffer is seventy-six frames per second. At this rate, the scan to the display cannot catch up with the copying to frame buffer 28; and frame tearing will not occur.

Figure 3:
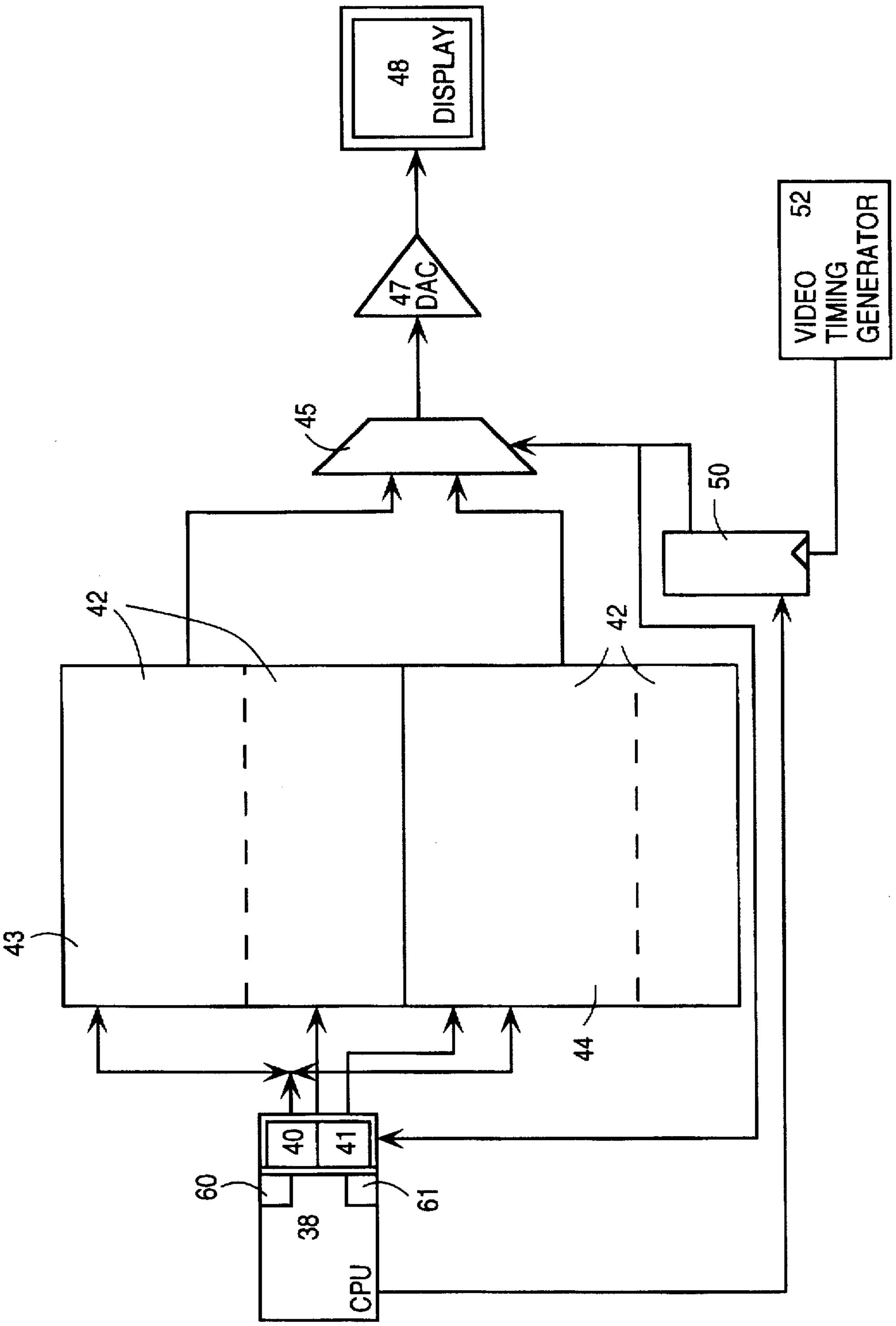
FIG. 3 is a block diagram of an output display architecture designed in accordance with the present invention.

Having provided an arrangement for accomplishing fast copying between frame buffers in an inexpensive arrangement for double buffering a multiple window environment, a problem arises as to how to deal with software which both expects double buffering to occur and software which does not expect double buffering. It is necessary from an economic basis that if a new arrangement replaces an older arrangement to allow a system to run more advanced software, that the new arrangement be suitable for running the software written for both the old and the new arrangements. FIG. 3 illustrates an architecture in accordance with the present invention in which software typically capable of operating only in a single buffered arrangement, advanced software capable of operating with double buffering, and multiple programs of such advanced software may all function.

The architecture is arranged with a rendering engine 38. This rendering engine 38 may be a central processing unit or some other arrangement such as a graphics accelerator for providing data to be written to an output display. The rendering engine 38 writes data under control of control circuits 40 and 41 into a single array of contiguous memory 42 which may be configured in various buffer arrangements in response to the software being run. The array 42, which may be configured into buffers, is constructed of VRAM and has two separate serial output terminals, one providing data from a first portion (preferrably half) of the array 42 and the other providing data from a second portion of the array 42. These output terminals are furnished as inputs to a multiplexor 45. The multiplexor 45 may select one or the other of the two output terminals for transferring data to a digital-to-analog converter 47 for display on an output display device 48.

In its simplest form useful in this invention, the array 42 provides sufficient memory to form two individual frame buffers. For example, if a output display having 1152 by 900 pixels is to be operated, then a sufficient number of memory positions to store twice that amount of pixel data is provided. In a preferred embodiment, four megabytes of VRAM are provided. This amount is sufficient to provide two individual frame buffers for a display having over 1600 by 1200 pixels. Using this larger amount of memory in the array allows many different sizes of displays to be used with the double buffering arrangement.

The arrangement of FIG. 3 operates in three different modes to accommodate software of all types in the manner described herein. In a first mode referred to herein as DBM0 (double buffer mode 0), the arrangement is adapted to operate with software which is not constructed to operate in a double buffering mode and will appear in no (0) double buffered windows. In general, programs such as word processing programs which change the information on the display slowly are of this type. It is possible to determine when software has been written to be single buffered. In software designed to run on Sun Microsystems SPARC format computers utilizing a GX graphics accelerator, for example, the addressing scheme provides high bits which are always zeroes when the program is to be single buffered. This occurs because the frame buffer addresses expected are limited to a total of one megabyte. Using such application software, the data written to the array 42 is merely addressed to a portion of the array 42 beginning at an address which is expected by the software to be the beginning address of a single frame buffer. The detection of such an address causes the setting of defaults indicating mode DBM0 in control circuits 40 and 41 to configure the array 42 as a single frame buffer. Sensing the address, the control circuits 40 and 41 assures that the engine 38 begins storing the pixel information in an area of the array 42 which extends from this beginning address within the array and continues for a sufficient number of storage positions to provide storage for a single frame buffer 43 of pixel data (e.g., the upper rectangle in array 42 bounded at its lower edge by the upper dotted line). The application software does not sense that any other storage space exists within the array 42 in this mode DBM0. In fact, it is possible for use with single buffered application programs to reduce the size of the array 42 which is populated with memory devices to an amount just sufficient to handle a single frame buffer. In such a case, the array 42 can act as no more than a simple frame buffer.

In an array 42 having more than such minimal memory, the beginning address for the single frame buffer portion chosen in mode DBM0 may be either in a physical portion of the array 42 controlled by control circuit 40 in which a first one 43 of two frame buffers might appear or in a physical portion of the array 42 controlled by control circuit 41 in which a second one 44 of two frame buffers might appear in a double buffered configuration (e.g., the lower rectangle in array 42 bounded at its lower edge by the lower dotted line). Depending on which position is chosen for the frame buffer by the rendering engine 38 (which may depend on any other use of the array 42), the defaults set in the control circuits 40 and 41 cause the serial output terminal to the multiplexor 45 from the portion of the array 42 being used to furnish data to be scanned to the display 48; and the multiplexor 45 will receive a control signal at a control terminal from the control circuits 40 and 41 of the rendering engine 38 to transfer that data directly to the digital-to-analog converter 47 for display on the output display 48. This selection of the serial output terminal which scans data to the output display and the selection of the area of the array 42 to use as a frame buffer will never change during the time one or more single buffered application programs are operating.

Although this does not make the most economic use of a large array 42, this mode DBM0 renders the arrangement of this invention entirely compatible with software which was not developed to operate in a double buffering mode. It should be noted that such single frame buffer software is not necessarily older software; it is simply software which does not require double frame buffering. Of interest is the possibility of using any extra portion of a populated array 42 for the storage of other information which it might be desired to write to the display at some time. For example, this unused portion of the array provides a two dimensional caching area which may be utilized in accordance with the invention disclosed in U.S. patent application Ser. No. 07/716,671, entitled *Method For Allocating Off-Screen Display Memory*, B. Mcintyre et al, filed Jun. 17, 1991, and assigned to the assignee of the present invention.

On the other hand, the arrangement of this invention may also be configured to provide a mode of operation called DBM1 (double buffer mode 1) to handle one double buffered window on the output display. As mention above in the discussion of FIG. 1, the data provided by such software is scanned to the display from a frame buffer to which data is never written during the scan; and new data is always written to a frame buffer which is not scanning to the display during the write operation. In this manner, no data is scanned from a buffer to which data is being written and frame tearing cannot occur. As pointed out, mode DBM1 operates only where no more than one double buffered window is being displayed; for using this form of architecture may produce incorrect visible windows with multiple double buffered windows. However, this form of double buffering does allow other single buffered windows to appear on the display simultaneously with the double buffered window. An application which expects to run in a single buffered environment typically exhibits so little change from frame to frame that writing to a frame from which a scan to the display is occurring will not produce noticeable frame tearing. Consequently, only the writing of data to a frame buffer by the double buffered application program is controlled so that it occurs during a period when data in the frame buffer is not being scanned to the display.

It is possible to determine when software has been written to be double buffered by placing an indication other than zero in the high order address bits which are always zeroes when the program is to be single buffered. This allows software to detect a double buffered program. When the rendering engine 38 is informed that a single software application program expects double frame buffering to occur, it sets defaults in the control circuits 40 and 41 to create a pair of frame buffers within the array 42 by writing to addresses beginning at two individual points in the array 42 separated sufficiently to provide storage for data to define two individual frames 43 and 44 on the output display 48. In a preferred embodiment, the array 42 is simply divided in half so that the serial output terminal from one portion of the array 42 functions as the serial output for a first frame buffer and the serial output terminal from the other portion of the array 42 functions as the serial output for a second frame buffer.

So long as only one application program running expects to be double buffered, the system operates in mode DBM1. In this mode, the one of the two serial output terminals to which data is not being written by the double buffered program is selected by control circuits 40 and 41 through the control signal applied to the multiplexor 45 to transfer data to the display 48 in the conventional manner. Thus, the arrangement functions in mode DBM1 in the same manner as a conventional double buffered output display capable of handling a single window.

An extremely useful ability of the arrangement results from the use of circuitry which assures that in the mode DBM1 switching the display 48 from one of the frame buffers to the other occurs only during the period of the vertical retrace on the output display and in a manner that the central processing unit need not wait for the switch to occur.

As pointed out above, only whole frames are actually displayed one after another on the output display to create a picture. The instant at which scanning from one frame buffer must be switched to scanning from the other frame buffer occurs only after one frame is completed on the display and the next frame has not yet begun. The switch must thus occur during the vertical retrace period of the display.

In a typical prior art circuit utilizing two frame buffers, the circuitry furnishing the data to be written to the two frame buffers will assert a signal indicating to the multiplexing circuitry that a write operation to a double buffered window of the inactive frame buffer is complete and that the frame therein may be scanned to the output display. Typically this signal is furnished by the central processing system. If a multiplexor such as the multiplexor 45 is in the middle of transferring a frame of information to the output display 48, that frame cannot be interrupted. Thus, the central processing system must continue to assert the signal until the frame is complete and the multiplexor 45 can switch to scan data from the other frame buffer. Since the central processing system must continue to assert the signal, it cannot accomplish other of its tasks during this interval. This causes a significant reduction in the speed of operation of the computer.

To eliminate this delay, the arrangement includes a register 50 which receives and stores the signal from the circuitry controlling the writing to the frame buffers in the array 42. Once the signal is applied to the register 50, the circuitry controlling the writing to the frame buffers may attend to other tasks. The signal in the register is provided as an input to toggle the multiplexor 45 to scan data from the other frame buffer to the display. An enabling signal to furnish the signal in the register to the multiplexor 45 is provided from the circuitry which controls the movement of the raster scan on the display. Typically, this circuitry resides within a video timing generator 52. This circuitry generates a signal when the raster scan reaches the bottom of the display and vertical retrace begins. This is the signal provided as the enabling signal to the register 50.

The output of the register 50 is then used to toggle the multiplexor 45 from scanning the output of one frame buffer of the array 45 to scanning the output of the other frame buffer to the display 48. Thus, the signal to toggle the multiplexor output occurs only when the signal indicating the beginning of the vertical retrace is received from the digital-to-analog converter 47. Consequently, the toggle between frame buffers occurs whenever the circuitry controlling the writing to the frame buffers indicates that a toggle should occur and the next vertical retrace period occurs. In this manner, the central processing unit is free to undertake other operations and the speed of operation of the system is increased. The central processing unit is not allowed to render until the register 50 has toggled. A detailed description of the arrangement for controlling the switching of the multiplexor in mode DBM1 is contained in U.S. patent application Ser. No. 07/716,001, entitled *Apparatus For Selecting Frame Buffers For Display In A Double Buffered Display System*, Priem et al, filed Jun. 17, 1991, and assigned to the assignee of the present invention.

When the array 42 is used with display software which is capable of presenting a number of N different double buffered windows on the display 48 simultaneously in the manner described with respect to FIG. 2, the arrangement of the present invention is configured to operate in a mode DBMN in which it renders new data into an invisible frame buffer area of the array 42 from which data is never scanned to the display 48 in the manner described in the copending patent application first mentioned above. However, while the arrangement described in the copending patent application uses DRAM for the invisible frame buffer, the array 42 is entirely constructed of VRAM. Because of this, the frame buffer portion chosen which is not scanned to the display may be either the area provided for the first or the second of the two frame buffers 43 or 44 in the last mentioned example. The particular area is controlled by the control circuits 40 and 41 when defaults are set therein indicating the mode DBMN. The fact that a particular portion of the array 42 is never scanned to the display is controlled by the multiplexor 45 on receipt of signals from the control circuits 40 and 41.

On the other hand, once new data has been written to the first (invisible frame buffer) portion 43 of the array 42, the data therein may be transferred to the second (visible frame buffer) portion 44 from which information may be scanned to the display. This copying from one frame buffer to the other is accomplished by the fast copy method described above under control of the control circuits 40 and 41 of the rendering engine 38. As described, the control circuits cause the data to be copied to be both read from the first frame buffer 43 and written to the second frame buffer 44 simultaneously by selecting the same addresses in both portions of the array 42 at the same time. The specific details of the fast copying arrangement are described in the copending patent application, entitled *Method and Apparatus for Fast Copying Between Frame Buffers In a Double Buffered Output Display System*, referred to above. In the arrangement of the present invention, software counts the number of double buffered application programs to be run and informs the rendering engine 38; and the rendering engine sets the mode of operation in the control circuits 40 and 41 to cause the array 42 to accomplish the desired result. The determination of the number of double buffered programs might also be ascertained by an incrementing/decrementing circuit in the rendering engine.

The control signal furnished by the control circuits 40 and 41 which selects the data from one or the other of the frame buffers in the array 42 is set (as it is in mode DBM0) to scan output only from one frame buffer at all times (in this case, the second buffer 44). In the mode DBMN case, that is the frame buffer to which new data is not being written. In this manner, the advanced form of double buffering may be implemented in the same arrangement. Once set up in this arrangement of buffers, data may be written to any of the windows stored in the hidden frame buffer by the rendering engine. When a change in a double buffered window has been completed, the rendering engine may select that particular window to be simultaneously read from the hidden frame buffer and written to the visible frame buffer using the fast copy provisions. Then the next frame to be scanned to the display will include the newly updated window. Since any portion of the invisible frame buffer may be selected for transfer by the rendering engine, when a next double buffered window has been completed, it too may be copied into the visible frame buffer for display.

An interesting facility offered by the arrangement of the present invention occurs because of the ability to sense whether an application program is a single buffered program or a double buffered program. In both of modes DBM1 and DBMN, when a single buffered program is sensed, it is written into both of the frame buffers simultaneously, whatever the window size allotted to it. Since the same data is written to each of the frame buffers for the single buffered program, the same data for a single buffered window is scanned to the display whatever the condition of the multiplexor 45 as controlled by the control signal transferred thereto. Thus, in mode DBM1 for example, any single buffered application program will produce the same output even though different frame buffers of the array 42 are being selected in response to control signals operating the multiplexor 45 to scan a double buffered application program to the display without frame tearing. In like manner, in mode DBMN a single buffered program is written to both frame buffers and thus is actually written to the buffer being scanned to the display. However, this is exactly the way a typical single buffered program is handled in a single buffered arrangement; it has no deleterious effect because the program is typically changing so slowly that frame tearing is not a problem.

The determination of which mode a program runs in is determined from the software being run. In single buffer mode programs, no indication is maintained as to the mode of buffering to be used. This lack of indication means data is written to the single frame buffer in mode DBM0 when no double buffered programs have been detected. On the other hand, where only one application is programmed to run a double buffered display system and has been detected, then mode DBM1 is selected. In this mode DBM1, the arrangement need not use the fast copy facility and utilizes the multiplexor to select which buffer is to be scanned to the frame buffer. In this mode, single buffered software is written to both frame buffers simultaneously. When two or more pieces of software designed to use the double buffering arrangement of the present invention are run, the rendering engine senses or is apprised by software that more than one double buffered program is operating and switches to mode DBMN where fast copying between an invisible and a visible frame buffer are accomplished. In this mode also, single buffered software is written to both frame buffers simultaneously. Thus, the arrangement of the present invention is capable of running in each of the three modes depending on the software running. Consequently, the arrangement is entirely compatible with all software which might be provided.

Figure 4:
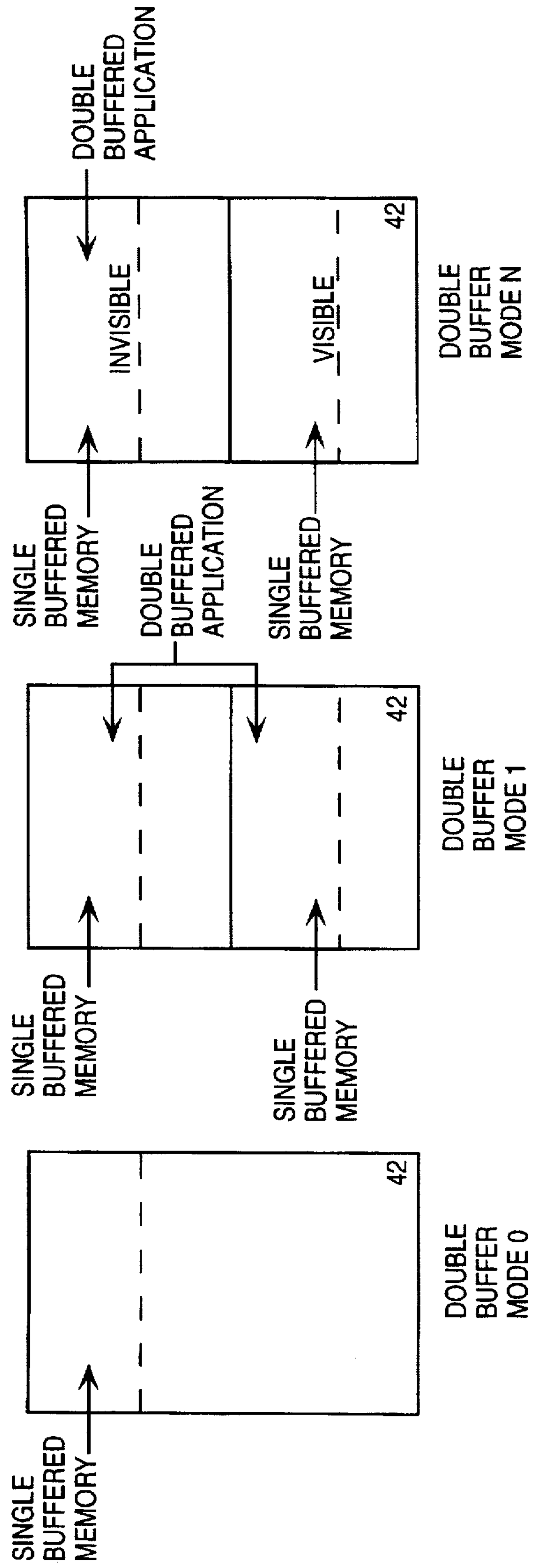
FIG. 4 is a diagram illustrating portions of memory utilized in different modes by an output display architecture designed in accordance with the present invention.

FIG. 4 illustrates the addressing arrangement used in each of the three conditions for this arrangement. The arrows indicate those portions of the array 42 to which each type of program is initially written. In mode DBM0, the control circuits 40 and 41 cause a first one to two megabytes of a four megabyte array 42 are used as a single frame buffer. The space of the array 42 not used as a frame buffer may be utilized in some other manner as discussed above. In mode DBM1, the control circuits 40 and 41 cause the array 42 to be divided into two individual frame buffers. If a program expects single buffering, it is written into both of these buffers simultaneously. If a program expects double buffering, it is written into the frame buffer not being scanned to the display; and the multiplexor controls which frame buffer is scanned to the display. In mode DBMN, the control circuits 40 and 41 cause the array 42 to be divided into two individual frame buffers. If a program expects single buffering, it is written into both of these buffers simultaneously. If a program expects double buffering, it is written into the invisible frame buffer which is never scanned to the display; the fast copying mode is utilized, typically to write individual double buffered windows to the visible frame buffer; and the multiplexor controls allows only one (the visible) frame buffer to be scanned to the display.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for arranging a video random access memory array to provide a plurality of frame buffers for an output display by which single buffered and double buffered applications may be run singly or simultaneously, said method comprising the steps of:

configuring said memory array to form a plurality of frame buffers depending upon which applications are running, said configuring step comprising the steps of:

configuring said memory array to form a single frame buffer if only single buffer applications are running;

configuring said memory array to form a first visible frame buffer and a second visible frame buffer if one double buffered application is running;

configuring said memory array to form a receive frame buffer to receive data and a transmit frame buffer to transmit data if a plurality of double buffered applications are running;

writing data to said memory array depending upon whether said applications are single or double buffered, said writing data step comprising the steps of:

writing to said single frame buffer if only single buffer applications are running;

simultaneously writing single buffered application data to both of said frame buffers when double buffered applications are running;

selecting data to be furnished to said output display from said frame buffers, said selecting data step comprising the steps of:

selecting data from said single frame buffer when only single buffer applications are running;

selecting data from the frame buffer, of said first and second visible frame buffers, to which no data is being written when one double buffered application is running;

selecting data from said transmit frame buffer when a plurality of double buffered applications are running.

2. The method as set forth in claim 1, wherein when said memory array is configured to form a first visible frame buffer and a second visible frame buffer then said writing step further comprises the step of:

writing data from said double buffered application to a frame buffer to which no data is being selected from.

3. The method as set forth in claim 1, wherein when said memory array is configured to form a receive frame buffer to receive data and a transmit frame buffer to transmit data then said writing data step further comprises the steps of:

writing data from said double buffered applications to said receive frame buffer;

copying data from said receive frame buffer to said transmit frame buffer by simultaneously selecting the same row and column addresses for both of said frame buffers, wherein data is read from said receive frame buffer and said data is written to said transmit frame buffer during the same operation.

4. A computer system that generates signals for displaying data, said computer system comprising:

a microprocessor;

an output display;

an array of video random access memory sufficient for storing at least two complete frames of output display data;

means for determining whether a program running on said microprocessor is designed to run in a single buffer environment or a double buffer environment;

means for tracking the number of programs running on said microprocessor designed to be run in a double buffered environment;

means for configuring said memory array to form a single frame buffer when used with programs designed to run in a single buffer environment, said means of configuring controlled by said means for determining and said means for tracking; and means for selecting data to be furnished to said output display, said means for selecting controlled by said means for tracking.

5. The computer system as set forth in claim 4, wherein said means for configuring said memory array forms:

a single frame buffer when used with programs designed to run in a single buffer environment;

a first visible frame buffer and a second visible frame buffer when used with one program designed to run in a double buffer environment; and a receive frame buffer to receive data and a transmit frame buffer to transmit data when used with a plurality of programs designed to run in a double buffered environment.

6. The computer system as set forth in claim 4, wherein:

said means for selecting data to be furnished depends on whether said program running is designed to be run in a single buffer environment, or a double buffer environment.

7. The computer system as set forth in claim 5, wherein said means for configuring comprises:

control means for responding to a plurality of programs designed to run in a double buffer environment, said control means configuring said memory array to form a receive frame buffer to receive display data, and a transmit frame buffer for transferring said display data to said output display, wherein fast copying data from said first frame buffer to said second frame buffer is used.

8. The computer system as set forth in claim 7, wherein said control means comprises:

means for writing said display data only to said receive frame buffer;

means for simultaneously selecting identical addresses for said receive frame buffer and said transmit frame buffer; and means for reading said display data from the receive frame buffer and writing said display data to said transmit frame buffer simultaneously.

9. The computer system as set forth in claim 6, wherein:

said means for selecting causes all data associated with programs designed to be run in a single buffer environment to be written to both frame buffers simultaneously when said means for configuring causes two frame buffers to be formed.

10. The computer system as set forth in claim 9, wherein said means for selecting further comprises:

means for selecting data from different portions of said array; and means for transferring said selected data from a portion of said array, wherein said array is configured as one pair of frame buffers when only one double buffered program is running.

11. The computer system as set forth in claim 10, wherein the means for transferring comprises:

a multiplexer;

means for storing a first signal indicating that said multiplexer is to select a different frame buffer for furnishing data to an output display; and means for furnishing said first signal to said multiplexer only when a frame on said output display is completely scanned and before a new frame commences.

12. The computer system as set forth in claim 11, wherein said means for furnishing comprises:

means for deriving a second signal from a video timing generator or control circuitry, indicating when the raster scan reaches the bottom of said output display and vertical retrace begins; and means for using said second signal from said video timing generator or control circuitry to furnish said first signal to said multiplexer means.

* * * * *